(12) United States Patent
Nguyen et al.

(10) Patent No.: US 10,966,488 B2
(45) Date of Patent: Apr. 6, 2021

(54) SHOE ACCESSORY SYSTEM

(71) Applicants: Thuy Duong Nguyen, Huntington Beach, CA (US); Duc Antoine Nguyen, Huntington Beach, CA (US)

(72) Inventors: Thuy Duong Nguyen, Huntington Beach, CA (US); Duc Antoine Nguyen, Huntington Beach, CA (US)

( * ) Notice: Subject to any disclaimer, the term of this patent is extended or adjusted under 35 U.S.C. 154(b) by 0 days.

(21) Appl. No.: 16/352,750

(22) Filed: Mar. 13, 2019

(65) Prior Publication Data

US 2019/0281928 A1  Sep. 19, 2019

Related U.S. Application Data

(60) Provisional application No. 62/761,173, filed on Mar. 14, 2018.

(51) Int. Cl.
| | | |
|---|---|---|
| *A43B 23/24* | (2006.01) | |
| *A43B 3/30* | (2006.01) | |
| *B29L 31/50* | (2006.01) | |
| *B29C 45/14* | (2006.01) | |

(52) U.S. Cl.
CPC .............. *A43B 23/24* (2013.01); *A43B 3/30* (2013.01); *B29C 45/14* (2013.01); *B29L 2031/50* (2013.01)

(58) Field of Classification Search
CPC ........ A43B 3/0078; A43B 23/24; A43C 11/24
USPC ..................... 36/112, 136; 40/636
See application file for complete search history.

(56) References Cited

U.S. PATENT DOCUMENTS

| | | | | |
|---|---|---|---|---|
| 1,716,634 A | * | 6/1929 | Henigan .................. | A43B 7/22 36/145 |
| 4,698,923 A | * | 10/1987 | Arff ........................ | A43B 13/26 36/128 |
| 5,456,095 A | * | 10/1995 | Tawil .................. | A44C 17/0216 24/574.1 |
| 6,108,944 A | * | 8/2000 | Savoie .................. | A43C 15/161 220/293 |
| 6,463,681 B1 | * | 10/2002 | Savoie .................. | A43C 15/161 36/127 |
| 7,698,836 B2 | * | 4/2010 | Schmelzer ............. | A43C 11/24 36/136 |
| 8,069,538 B2 | * | 12/2011 | Wilcox .................... | A43C 1/00 24/109 |
| 8,122,519 B2 | | 2/2012 | Schmelzer et al. | |
| 9,516,931 B2 | * | 12/2016 | Mencagli .................. | A44B 1/32 |
| 10,070,697 B1 | * | 9/2018 | Melgoza ................ | A44C 3/001 |

(Continued)

*Primary Examiner* — Ted Kavanaugh
(74) *Attorney, Agent, or Firm* — John D. Tran; Rhema Law Group

(57) ABSTRACT

A shoe accessory system and methods can include: an accessory connector having a male accessory mount and a female accessory mount: the male accessory mount including a base, a protrusion mounted above the base, an outwardly protruding lip extending from the protrusion, the outwardly protruding lip having a slope extending down toward an abutment, and the female accessory mount having inwardly extending flanges, the inwardly extending flanges extend in toward a center of the female accessory mount, the inwardly extending flanges spaced apart allowing the protrusion to fit therebetween; a shoe affixed to the male accessory mount; and an accessory affixable to the female accessory mount for allowing the accessory to be placed over the male accessory mount, pressed down, and twisted to lock the accessory onto the shoe.

16 Claims, 6 Drawing Sheets

(56) References Cited

U.S. PATENT DOCUMENTS

| | | | |
|---|---|---|---|
| 2008/0060110 A1* | 3/2008 | Schmelzer | A44B 1/32 2/69 |
| 2012/0234042 A1* | 9/2012 | Chase | A43B 3/12 63/1.18 |
| 2014/0259764 A1* | 9/2014 | Schoenleber | A43D 999/00 36/65 |
| 2015/0157093 A1* | 6/2015 | Fowler | A43B 3/105 36/136 |

* cited by examiner

SHOE ACCESSORY SYSTEM

CROSS-REFERENCE TO RELATED APPLICATIONS

This claims priority benefit to all common subject matter of U.S. Provisional Patent Application No. 62/761,173 filed Mar. 14, 2018. The content of this application is incorporated herein by reference in its entirety.

TECHNICAL FIELD

This disclosure relates to apparel, more particularly to apparel employing detachable accessories.

BACKGROUND

The rapidly growing market for apparel, e.g. jackets, shoes, and other clothing is an integral facet of modern life. The merging of apparel and fashion accessories represents one of the largest potential market opportunities for next generation apparel-accessory systems.

These apparel-accessory systems manifest unique attributes that significantly impacts the manufacture of components contained therein, in that they must be generally small, lightweight, power efficient, rich in functionality, intuitively useable, and they must be produced in high volumes at relatively low cost.

As an extension of the apparel industry, the shoe industry, including children's shoes, has witnessed ever-increasing commercial competitive pressures, along with growing consumer expectations and the diminishing opportunities for meaningful product differentiation in the marketplace.

Children's feet grow so quickly that they often grow out of their shoes before they have had a chance to wear them. However, parents still need to buy shoes for their children.

What's more, parents often buy multiple pairs and styles to compliment different outfits and occasions. This can be prohibitively expensive and wasteful.

Children often do not put enough wear and tear on their shoes before growing out of them as well, which is bad for the environment as more and more shoes end up in landfills. Thus, a need still remains for a shoe with interchangeable accessories for matching the shoe with different outfits and to change the look of the shoe.

Previous attempts at modifying the look of a shoe often resulted in permanent change, such as dying, coloring, or stenciling. Even when the change is not permanent such as changing shoe laces, the modification can be difficult to undo especially for children.

In view of the ever-increasing commercial competitive pressures, along with growing consumer expectations and the diminishing opportunities for meaningful product differentiation in the marketplace, it is critical that answers be found for these problems. Additionally, the need to reduce costs, reduce production and design time, and meet competitive pressures, adds an even greater urgency to the critical necessity for finding apparel that can be readily modified with accessories having standardized connection mechanisms.

Solutions have been long sought but prior developments have not taught or suggested any complete solutions, and solutions to these problems have long eluded those skilled in the art. Thus, there remains a considerable need for devices and methods that can be readily modified with accessories having standardized connection mechanisms.

SUMMARY

A shoe accessory system and methods, that can be readily modified with accessories having standardized connection mechanisms. The shoe accessory system and methods can include: an accessory connector having a male accessory mount and a female accessory mount: the male accessory mount including a base, a protrusion mounted above the base, an outwardly protruding lip extending from the protrusion, the outwardly protruding lip having a slope extending down toward an abutment, and the female accessory mount having inwardly extending flanges, the inwardly extending flanges extend in toward a center of the female accessory mount, the inwardly extending flanges spaced apart allowing the protrusion to fit therebetween; a shoe affixed to the male accessory mount; and an accessory affixable to the female accessory mount for allowing the accessory to be placed over the male accessory mount, pressed down, and twisted to lock the accessory onto the shoe.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The shoe accessory system is illustrated in the figures of the accompanying drawings which are meant to be exemplary and not limiting, in which like reference numerals are intended to refer to like components, and in which.

DETAILED DESCRIPTION

Figure 1:
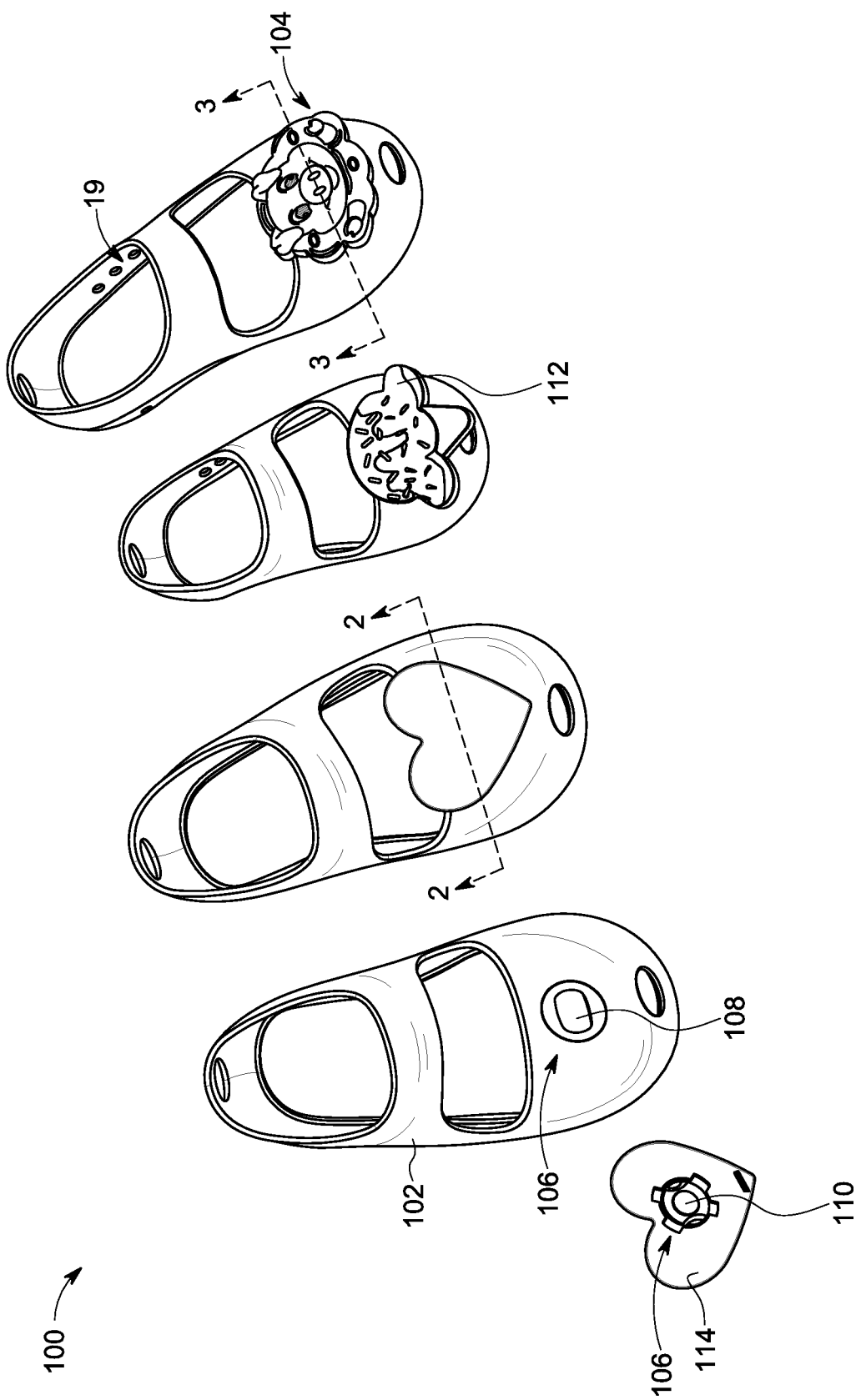
FIG. 1 is an isometric view of the shoe accessory system.

In the following description, reference is made to the accompanying drawings that form a part hereof, and in which are shown by way of illustration, embodiments in which the shoe accessory system may be practiced. It is to be understood that other embodiments may be utilized and structural changes may be made without departing from the scope of the shoe accessory system.

When features, aspects, or embodiments of the shoe accessory system are described in terms of steps of a process, an operation, a control flow, or a flow chart, it is to be understood that the steps can be combined, performed in a different order, deleted, or include additional steps without departing from the shoe accessory system as described herein.

The shoe accessory system is described in sufficient detail to enable those skilled in the art to make and use the shoe accessory system and provide numerous specific details to give a thorough understanding of the shoe accessory system; however, it will be apparent that the shoe accessory system may be practiced without these specific details.

In order to avoid obscuring the shoe accessory system, some well-known system configurations and descriptions are not disclosed in detail. Likewise, the drawings showing embodiments of the system are semi-diagrammatic and not to scale and, particularly, some of the dimensions are for the clarity of presentation and are shown greatly exaggerated in the drawing FIGs. Generally, the shoe accessory system can be operated in any orientation.

As used herein, the term system is defined as a device or method depending on the context in which it is used. For expository purposes, the term "horizontal" as used herein is defined as a plane parallel to the top plane or surface of the male protrusion of the accessory connector, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane.

Referring now to FIG. 1, therein is shown an isometric view of the shoe accessory system 100. The shoe accessory system 100 can be depicted as shoes 102 having accessories 104, attached thereto.

Each of the accessories 104 can be affixed to the shoes 102 with an accessory connector 106. The accessory connectors 106 can include a male accessory mount 108 configured to couple with a female accessory mount 110.

The male accessory mount 108 is depicted extending outward from the shoe 102. The female accessory mount 110 can be affixed within the accessory 104. Both the male accessory mount 108 and the female accessory mount 110 can be formed from any suitable material such as a metal like zinc alloy or a strong plastic like a hard PVC.

It is contemplated that the accessories 104 can be any kind of accessory bauble, ornaments, or embellishment. For descriptive clarity, the shoe accessory system 100 is depicted in reliance on a toddler shoe.

However, as used herein, the term "shoe" should be understood to mean footwear of any type including children's shoes, adult's shoes, boots, slippers, casual shoes, sandals, rain boots, or other type of footwear. The accessory 104 can include a display surface 112 and a back surface 114.

The female accessory mount 110 can be affixed within the back surface 114 of the accessory 104. When a user wishes to attach the accessory 104 to the shoe 102, the user may place the female portion on the male portion, push, and twist.

The accessory 104 will lock into place. If the user wishes to remove the accessory the accessory 104 must be pushed down and twisted in the opposite direction.

This two step removal process greatly improves the usability of the shoe accessory system 100 especially when used by small children because the accessory 104 will stay in place until the two step removal process is performed. This extra step can be especially important for novice walkers who trip and fall easily, which can result in extreme forces applied to the accessory 104.

Figure 2:
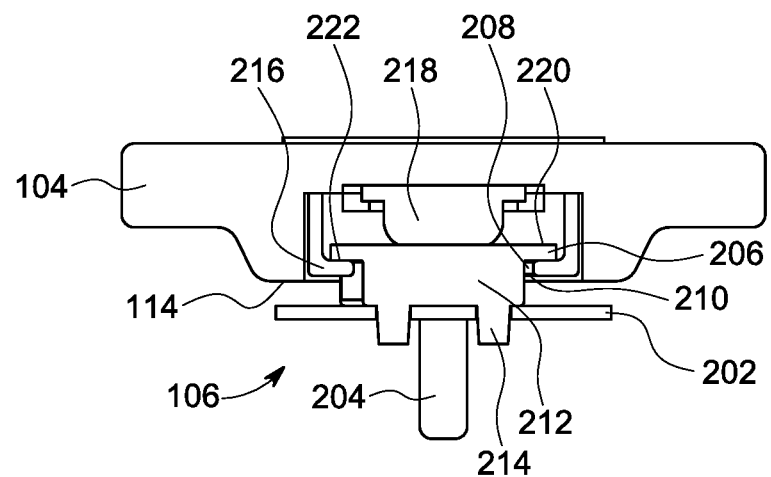
FIG. 2 is a side view of the accessory along the line 2-2 of FIG. 1 in a locked phase of operation.

Referring now to FIG. 2, therein is shown a side view of the accessory along the line 2-2 of FIG. 1 in a locked phase of operation. The accessory 104 is shown affixed to the accessory connector 106.

The accessory connector 106 can extend into the accessory 104 from the back surface 114. The male accessory mount 108 of FIG. 1 is in a locked engagement with the female accessory mount 110 of FIG. 1.

The male accessory mount 108 can include a base 202 having rivets 204. The rivets 204 can extend down into the shoe 102 of FIG. 1 riveting the male accessory mount 108 to the shoe 102. It has been discovered that the use of two rivets can ensure that the male component does not move or rotate with regard to the shoe 102, when twisting the accessory 104.

The base 202 can have a circular shape extended horizontally out past the sides of the female accessory mount 110 for providing greater mechanical rigidity. This importantly ensures that the accessory 104 will not lean or fall to one side or the other.

The male accessory mount 108 can include outwardly protruding lips 206 on either end of the male accessory mount 108. Under each of the outwardly protruding lips 206, the male accessory mount 108 can further include a slope 208 and an abutment 210.

The slopes 208 and the abutments 210 can be formed on a protrusion 212 extending up away from the base 202. The protrusion 212 can be in direct contact with the base 202 and can be affixed thereto or can be formed integrally therewith.

The protrusion 212 can have rotational stabilizers 214 extending from the bottom of the protrusion 212 through the base 202 to exit below the base 202. It has been contemplated that the rotational stabilizers 214 can ensure the protrusion 212 does not rotate while the accessory 104 is being put on or taken off.

The rotational stabilizers 214 can offer rotational stability by transferring any torque input on the protrusion 212, to the rivets 204, and into the shoe 102. It is alternatively contemplated that the rotational stabilizers 214 could be flush with the bottom portion of the base 202.

The outwardly protruding lips 206 of the protrusion 212 can be in direct contact with the female accessory mount 110. The female accessory mount 110 is depicted fully within the accessory 104.

The female accessory mount 110 can include two inwardly extending flanges 216. The inwardly extending flanges 216 can extend in toward the center of the female accessory mount 110. The inwardly extending flanges 216 can be spaced apart sufficiently to fit portions of the protrusion 212, not having the outwardly protruding lips 206, therebetween. The inwardly extending flanges 216 of the female accessory mount 110 can be long enough to provide physical contact with the slope 208 and the abutment 210 without scraping on the male accessory mount 108.

When the inwardly extending flanges 216 are placed over the portion of the protrusion 212 not having the outwardly protruding lips 206, the accessory 104 can be twisted. When the accessory 104 is twisted after being placed on the protrusion 212 of the male accessory mount 108, the inwardly extending flanges 216 will first impinge on the slopes 208 under the outwardly protruding lips 206.

The slopes 208 will force the inwardly extending flanges 216 down toward the base 202 as the user twists the accessory 104 clockwise. As the user continues to twist the inwardly extending flanges 216 will reach the end of the slope 208 and will snap back up away from the base 202.

The snap results from the compression of a spring 218, which can be glued to an underside of the top of the female accessory mount 110. For additional rigidity between the spring 218 and the accessory 104, the spring 218 can be glued directly to the accessory 104, as is depicted in FIG. 2. As the slopes 208 force the inwardly extending flanges 216 of the female accessory mount 110 down toward the base 202, the spring 218 will compress and store energy, which can be released when the inwardly extending flanges 216 reach the end of the slope 208.

The spring 218 can be a rubber spring, a plastic spring, a silicon spring, a metal spring, or a combination thereof. The spring 218 is shown having a hemispherical shape which can contact the top surface of the protrusion 212 of the male accessory mount 108 when the female accessory mount 110 is mated therewith.

The compression of the spring 218, can force the accessory 104 out away from the male accessory mount 108 allowing top surfaces 220 of the inwardly extending flanges 216 to directly contact bottom surfaces 222 of the outwardly protruding lips 206.

This contact ensures a mechanically rigid connection between the female accessory mount 110 and the male accessory mount 108. The abutments 210 can contact the side of the inwardly extending flanges 216 ensuring the inwardly extending flanges 216, and by extension the accessory 104, will be rotationally rigid. If the user wishes to remove the accessory 104, the accessory 104 can be pressed down so that the inwardly extending flanges 216 can fall below the abutments 210 and then twisted. It will be appreciated that the accessory 104 together with the female accessory mount 110 are spaced apart from the base 202 of the male accessory mount 108 when in the locked phase of operation.

Figure 3:
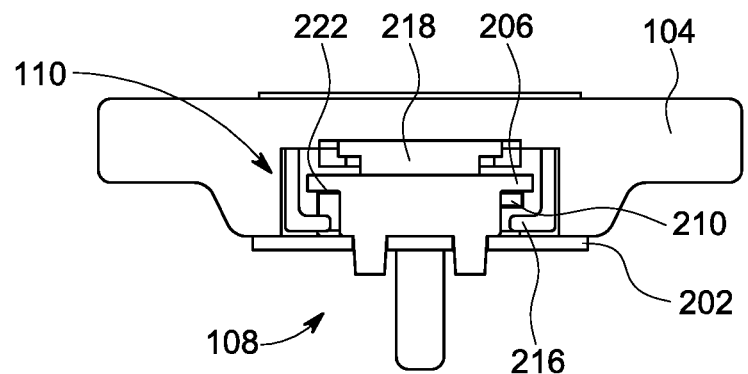
FIG. 3 is a side view of the accessory along the line 3-3 of FIG. 1 in an unlocked phase of operation.

Referring now to FIG. 3, therein is shown a side view of the accessory along the line 3-3 of FIG. 1 in an unlocked phase of operation. The spring 218 is shown fully compressed with the accessory 104 in contact with the base 202.

As the accessory 104 is pressed down away from the bottom surfaces 222 of the outwardly protruding lips 206 and toward the base 202, the inwardly extending flanges 216 will drop below the abutments 210 allowing the accessory 104 to be rotated and released from the male accessory mount 108. If the accessory 104 is not pressed down, the accessory 104 will return to the locked phase of operation as the spring 218 will be released, forcing the accessory 104 and the female accessory mount 110 up away from the base 202.

Figure 4:
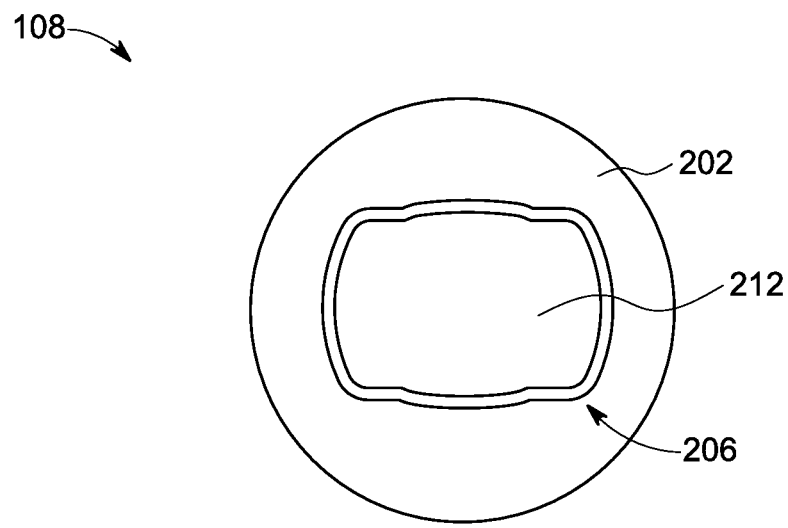
FIG. 4 is a top view of the male accessory mount of FIG. 1.

Referring now to FIG. 4, therein is shown a top view of the male accessory mount 108 of FIG. 1. The male accessory mount 108 is depicted having the protrusion 212 extended from a middle of the base 202. The protrusion 212 is shown having the outwardly protruding lips 206 extending therefrom.

Figure 5:
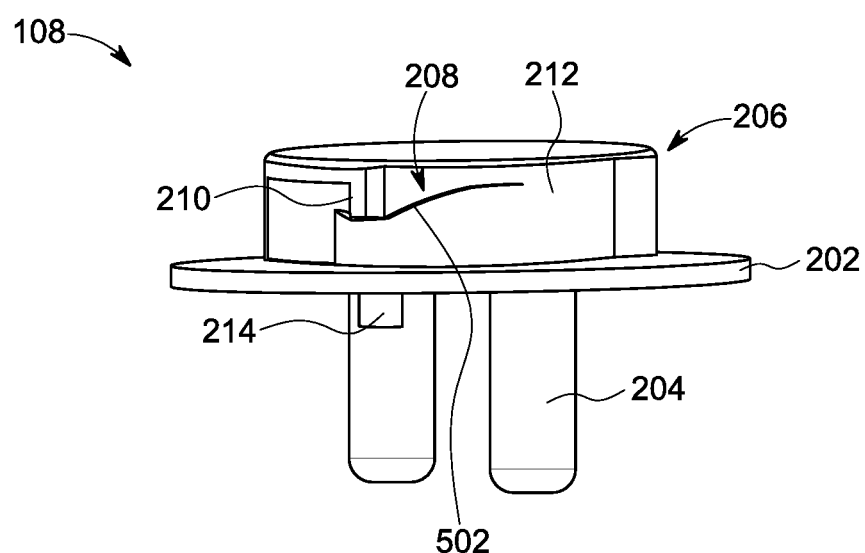
FIG. 5 is a side view of the male accessory mount of FIG. 1.

Referring now to FIG. 5, therein is shown a side view of the male accessory mount 108 of FIG. 1. The male accessory mount 108 is shown with the rivets 204 extending down from the base 202.

The rotational stabilizers 214 can extend down from the protrusion 212 and extend through the base 202. The protrusion 212 is shown to have the slope 208 and abutment 210 formed below the outwardly protruding lips 206.

The slope 208 can be generally angled toward the base 202 with a slope surface 502. The slope surface 502 can face and be exposed toward the base 202. The slope surface 502 can be formed within the outwardly protruding lips 206.

The slope surface 502 can function by contacting the top surfaces 220 of FIG. 2 of the inwardly extending flanges 216 of FIG. 2, and forcing them down toward the base 202 as the accessory 104 of FIG. 1 is rotated with respect to the male accessory mount 108.

Figure 6:
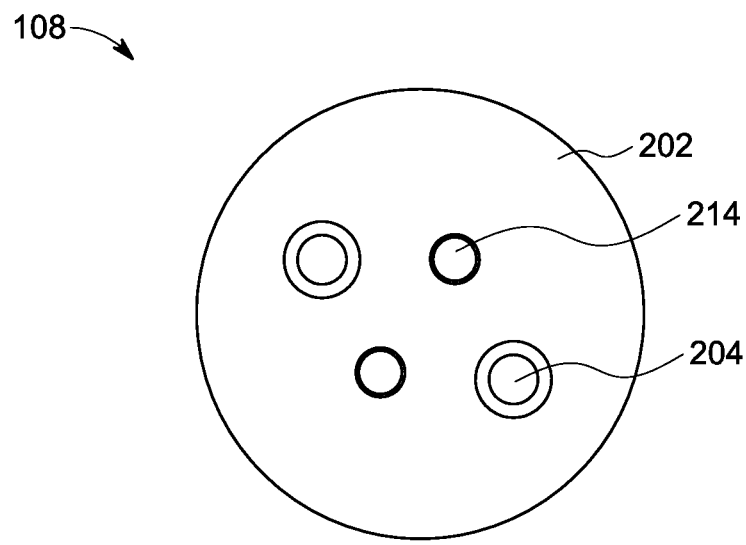
FIG. 6 is a bottom view of the male accessory mount of FIG. 1.

Referring now to FIG. 6, therein is shown a bottom view of the male accessory mount 108 of FIG. 1. The rivets 204 and the rotational stabilizers 214 are shown extending from the base 202.

Figure 7:
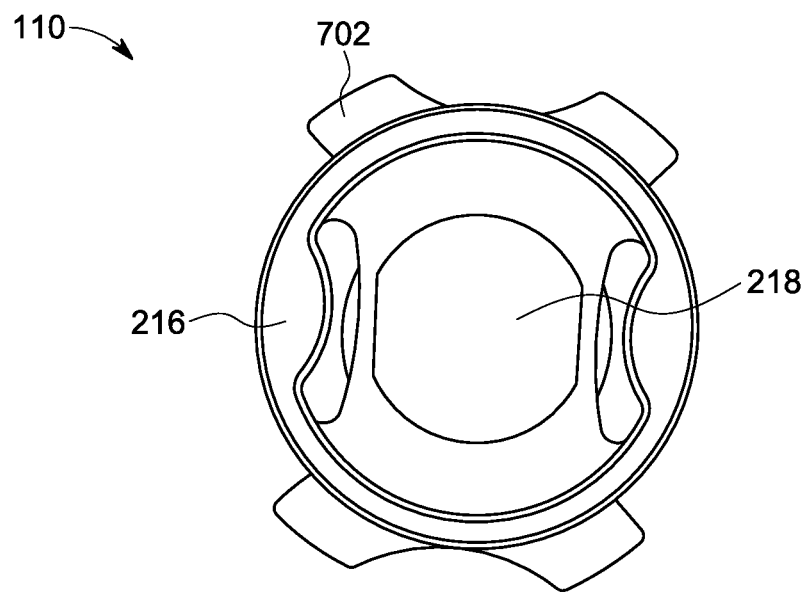
FIG. 7 is a bottom view of the female accessory mount of FIG. 1.

Referring now to FIG. 7, therein is shown a bottom view of the female accessory mount 110 of FIG. 1. The female accessory mount 110 is shown having mounting extensions 702 extended outwardly therefrom.

The spring 218 is shown between the inwardly extending flanges 216. The inwardly extending flanges 216 are shown as curved extensions.

Figure 8:
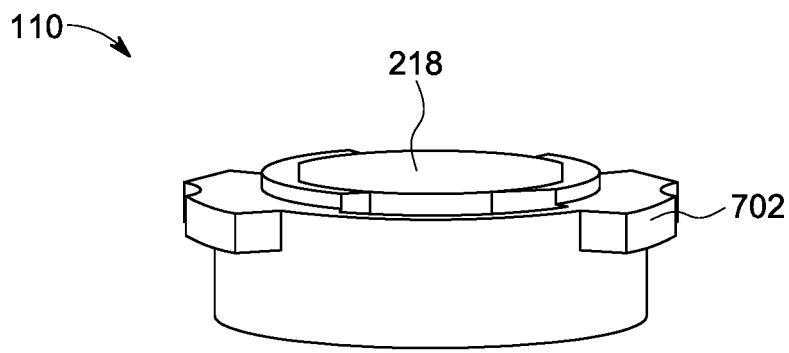
FIG. 8 is a side view of the female accessory mount of FIG. 1.

Referring now to FIG. 8, therein is shown a side view of the female accessory mount 110 of FIG. 1. The female accessory mount 110 is shown having the mounting extensions 702 extended out away from the female accessory mount 110.

A back surface of the spring 218 is also depicted near a horizontal center of the female accessory mount 110. The back surface of the spring 218 can be exposed from the female accessory mount 110 allowing the spring 218 to be adhered, affixed, or glued directly to the accessory 104.

Figure 9:
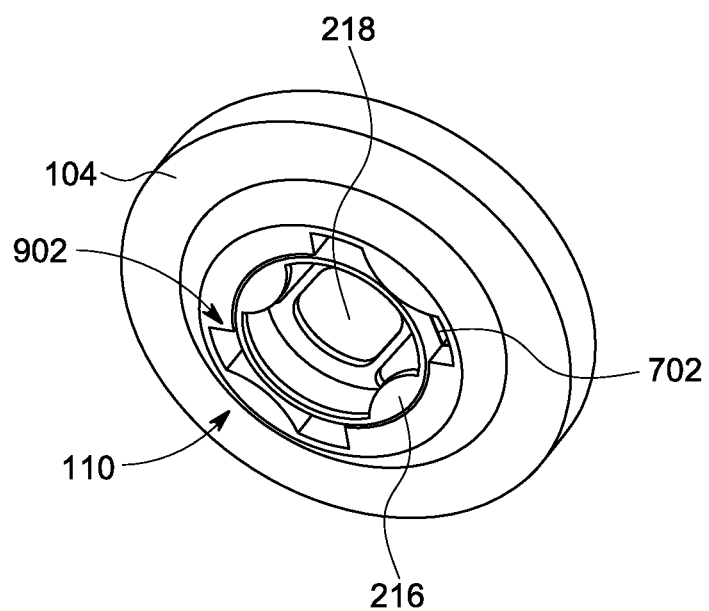
FIG. 9 is an isometric view of the female accessory mount of FIG. 1 and the accessory of FIG. 1.

Referring now to FIG. 9, therein is shown an isometric view of the female accessory mount 110 of FIG. 1 and the accessory 104 of FIG. 1. The mounting extensions 702 of the female accessory mount 110 can be pressed into a mounting recess 902 within the accessory 104.

The mounting recess 902 can be shaped to allow the mounting extensions 702 together with the rest of the female accessory mount 110 to be pressed therein. When the female accessory mount 110 is fully within the mounting recess 902, the accessory 104 and the female accessory mount 110 can be twisted with respect to each other.

The twisting action locks the female accessory mount 110 into the accessory 104 by forcing the mounting extensions 702 between surfaces of the accessory 104. This sandwiching of the mounting extensions 702 between surfaces of the accessory 104 can create a barrier for rotation between the female accessory mount 110 and the accessory 104.

Once the female accessory mount 110 is secured within the accessory 104, the accessory 104 can be affixed to the male accessory mount 108. The spring 218 is shown between the inwardly extending flanges 216.

Figure 10:
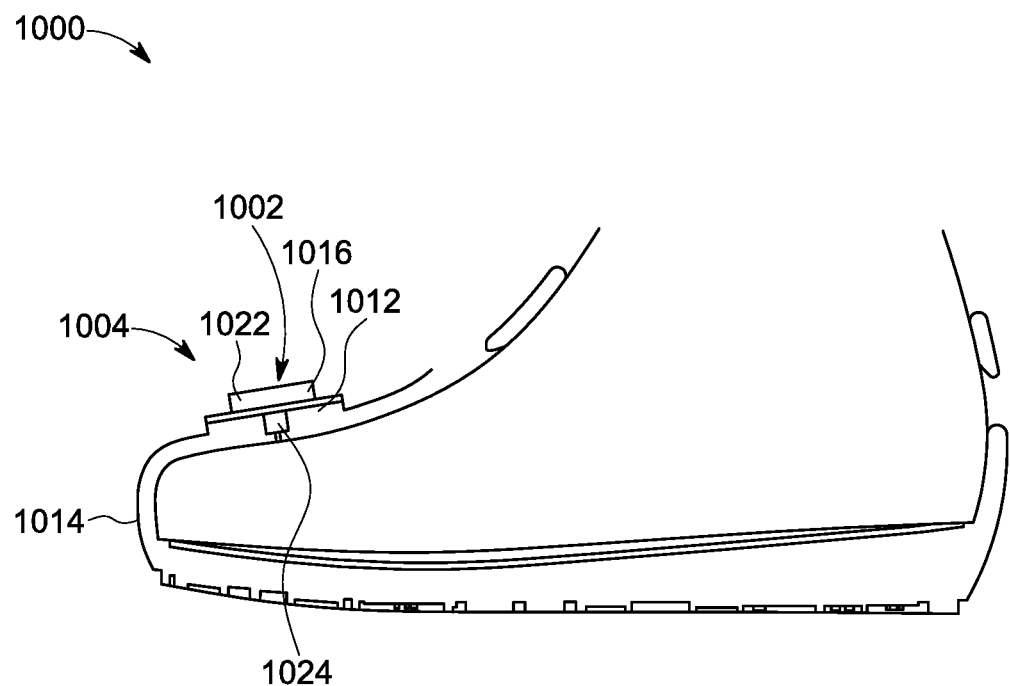
FIG. 10 is a side view of the shoe accessory system in a second embodiment.

Referring now to FIG. 10, therein is shown a side view of the shoe accessory system 1000 in a second embodiment. For descriptive clarity, the shoe accessory system 1000 is described with regard to a male accessory mount 1002 of an accessory connector 1004.

The male accessory mount 1002 should be understood to function identically to the male accessory mount 108 of FIG. 1 in relation to the female accessory mount 110 of FIG. 1. Further it is contemplated that the accessory 104 of FIG. 1 together with the female accessory mount 110 could be used with the male accessory mount 1002 without modification.

The male accessory mount 1002 can provide a locked and unlocked configuration with the female accessory mount. The male accessory mount 1002 can include a base 1012 injection molded onto a shoe 1014 or can be formed through injection molding onto the shoe 1014. It has been discovered that forming the base 1012 using injection molding onto the shoe 1014 can significantly decrease labor while simultaneously increasing structural rigidity and durability.

The base 1012 can have a circular shape extended horizontally out past the sides of the female accessory mount for providing greater mechanical rigidity. This importantly ensures that the accessory will not lean or fall to one side or the other.

The base 1012 can have characteristics of being formed by injection molding including seams created by an injection mold and surface irregularities created by injection ports. The base 1012 can have further attributes of being formed by injection molding including being formed as a layer of the shoe 1014, including being directly in contact and affixed to the shoe 1014.

The male accessory mount 1002 can include outwardly protruding lips 1016 on either end of the male accessory mount 1002. Under each of the outwardly protruding lips 1016, the male accessory mount 1002 can further include a slope (not shown) and an abutment (not shown). It should be understood that the slope and abutment of this embodiment are identical to the slope 208 of FIG. 2 and the abutment 210 FIG. 2.

The slopes and the abutments can be formed on a protrusion 1022 extending up away from the base 1012. The protrusion 1022 can be in direct contact with the base 1012 and can be affixed thereto or can be formed integrally therewith.

The protrusion 1022 can have rotational stabilizers 1024 extending from the bottom of the protrusion 1022 into the base 1012 and into the shoe 1014. It has been contemplated that the rotational stabilizers 1024 can ensure the protrusion 1022 does not rotate while the accessory 1002 is being put on or taken off.

The rotational stabilizers 1024 can offer rotational stability by transferring any torque input on the protrusion 1022, through the base 1012, and into the shoe 1014. It is alternatively contemplated that the rotational stabilizers 1024 could be flush with the bottom portion of the base 1012.

Figure 11:
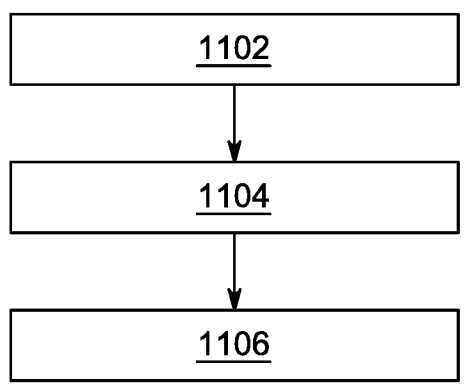
FIG. 11 is a flow chart for manufacturing the shoe accessory system.

Referring now to FIG. 11, therein is shown a flow chart for manufacturing the shoe accessory system. The flow chart can include providing an accessory connector having a male accessory mount and a female accessory mount: the male accessory mount including a base, a protrusion mounted above the base, an outwardly protruding lip extending from the protrusion, the outwardly protruding lip having a slope extending down toward an abutment, and the female accessory mount having inwardly extending flanges, the inwardly extending flanges extend in toward a center of the female accessory mount, the inwardly extending flanges spaced apart allowing the protrusion to fit therebetween in a block 1102; affixing a shoe to the male accessory mount in a block 1104; and forming an accessory configured to be affixed to the female accessory mount for allowing the accessory to be placed over the male accessory mount, pressed down, and twisted to lock the accessory onto the shoe in a block 1106.

Thus, it has been discovered that the shoe accessory system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the shoe accessory system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A shoe accessory system comprising:
   an accessory connector having a male accessory mount and a female accessory mount:
      the male accessory mount including a base, a protrusion mounted above the base, an outwardly protruding lip extending from the protrusion, the outwardly protruding lip having a slope extending down toward an abutment, and
      the female accessory mount having a spring located between inwardly extending flanges, the inwardly extending flanges extend in toward a center of the female accessory mount, the inwardly extending flanges spaced apart allowing the protrusion to fit therebetween and elastically deform the spring;
   a shoe affixed to the base of the male accessory mount; and
   an accessory releasably affixable to the female accessory mount for allowing the accessory to be placed over the male accessory mount, pressed down, and twisted to lock the accessory onto the shoe, the accessory includes a mounting recess and a mounting extension, the mounting recess configured for the female accessory mount to fit therein, the mounting extension configured to fit within the mounting recess and rotate within the mounting recess for releasably affixing the female accessory mount to the accessory.

2. The system of claim 1 wherein the male accessory mount includes two rivets extending down from the base into the shoe or includes characteristics of being formed through injection molding for rotationally locking the male accessory mount with respect to the shoe.

3. The system of claim 1 wherein the male accessory mount includes a rotational stabilizer extending from the protrusion into the base.

4. The system of claim 1 wherein the accessory is releasably affixed to the female accessory mount for allowing the accessory to be locked based on one of the inwardly extending flanges being in contact with the abutment.

5. The system of claim 1 wherein the accessory includes a display surface for a bauble, ornament, or embellishment.

6. The system of claim 1 wherein the protrusion of the male accessory mount and the inwardly extending flanges of the female accessory mount are formed from metal, PVC, or a combination thereof.

7. The system of claim 1 wherein the spring between the inwardly extending flanges is a rubber spring, a plastic spring, a silicon spring, a metal spring, or a combination thereof.

8. A method of manufacturing a shoe accessory system comprising:
   providing an accessory connector having a male accessory mount and a female accessory mount:
      the male accessory mount including a base, a protrusion mounted above the base, an outwardly protruding lip extending from the protrusion, the outwardly protruding lip having a slope extending down toward an abutment, and
      the female accessory mount having a spring located between inwardly extending flanges, the inwardly extending flanges extend in toward a center of the female accessory mount, the inwardly extending flanges spaced apart allowing the protrusion to fit therebetween and elastically deform the spring;

affixing a shoe to the base of the male accessory mount; and forming an accessory configured to be releasably affixed to the female accessory mount for allowing the accessory to be placed over the male accessory mount, pressed down, and twisted to lock the accessory onto the shoe.

9. The method of claim 8 wherein affixing the shoe to the male accessory mount includes riveting the base to the shoe or injection molding the base to the shoe for rotationally locking the male accessory mount with respect to the shoe.

10. The method of claim 8 wherein providing the accessory connector includes providing the male accessory mount having a rotational stabilizer extending from the protrusion into the base.

11. The method of claim 8 wherein forming the accessory includes forming the accessory releasably affixable to the female accessory mount for allowing the accessory to be locked based on one of the inwardly extending flanges being in contact with the abutment.

12. The method of claim 8 wherein forming the accessory includes forming a display surface for a bauble, ornament, or embellishment.

13. The method of claim 8 wherein forming the accessory includes forming the accessory having a mounting recess, the mounting recess configured for the female accessory mount to fit therein.

14. The method of claim 13 wherein providing the accessory connector includes providing the female accessory mount further having a mounting extension, the mounting extension configured to fit within the mounting recess and rotate within the mounting recess for releasably affixing the female accessory mount to the accessory.

15. The method of claim 8 wherein providing the accessory connector includes forming the protrusion of the male accessory mount and the inwardly extending flanges of the female accessory mount from metal, PVC, or a combination thereof.

16. The method of claim 8 wherein providing the accessory connector includes forming the spring between the inwardly extending flanges as a rubber spring, a plastic spring, a silicon spring, a metal spring, or a combination thereof.

* * * * *